United States Patent [19]

Hering

[11] Patent Number: 5,261,517
[45] Date of Patent: Nov. 16, 1993

[54] MULTI-DISK CLUTCH

[75] Inventor: Hubert Hering, Kirchheim, Fed. Rep. of Germany

[73] Assignee: Deere & Company, Moline, Ill.

[21] Appl. No.: 900,208

[22] Filed: Jun. 17, 1992

[30] Foreign Application Priority Data

Jun. 17, 1991 [DE] Fed. Rep. of Germany ....... 4119874

[51] Int. Cl.⁵ .................................. F16D 25/06
[52] U.S. Cl. .................. 192/91 A; 192/58 C; 192/70.27; 192/85 AA
[58] Field of Search ....... 192/91 A, 57, 58 C, 192/85 CA, 85 AA, 70.27

[56] References Cited

U.S. PATENT DOCUMENTS

| 2,516,544 | 7/1950 | Breeze | 192/91 A X |
| 2,775,328 | 12/1956 | Brundage | 192/57 |
| 3,016,121 | 1/1962 | Mosbacher | 192/91 A X |
| 3,151,717 | 10/1964 | Kaptur et al. | 192/91 A X |
| 3,461,993 | 8/1969 | Brundage | 192/91 A |
| 3,804,219 | 4/1974 | Cummings, III | 192/91 A X |
| 3,927,737 | 12/1975 | Prillinger et al. | 192/91 A X |
| 4,128,023 | 12/1978 | Kinder | 192/91 A X |
| 4,287,781 | 9/1981 | Zenker | 192/91 A X |
| 4,458,797 | 7/1984 | Hawkins | 192/52 |
| 4,573,561 | 3/1986 | Deem et al. | 192/91 A |
| 4,682,678 | 7/1987 | Kussel et al. | 192/56 F |
| 4,694,946 | 9/1987 | Pearch et al. | 192/85 AA |
| 4,775,041 | 10/1988 | Boffelli | 192/70.27 |
| 4,776,444 | 10/1988 | Worner et al. | 192/85 CA |
| 5,080,211 | 1/1992 | Wiese et al. | 192/58 C X |
| 5,094,328 | 3/1992 | Palmer | 192/58 C X |

FOREIGN PATENT DOCUMENTS

| 224680 | 4/1959 | Australia | 192/91 A |
| 0365794 | 5/1990 | European Pat. Off. | |
| 1286836 | 3/1969 | Fed. Rep. of Germany | |
| 1475499 | 6/1969 | Fed. Rep. of Germany | |
| 1675242 | 2/1971 | Fed. Rep. of Germany | |
| 2042289 | 3/1972 | Fed. Rep. of Germany | |
| 3605004 | 8/1986 | Fed. Rep. of Germany | |
| 1518672 | 3/1968 | France | |
| 2583479 | 12/1986 | France | |
| 2633024 | 12/1989 | France | |
| 46-21523 | 7/1971 | Japan | 192/91 A |
| 586385 | 3/1947 | United Kingdom | |
| 1483860 | 8/1977 | United Kingdom | |
| 85/05660 | 12/1985 | World Int. Prop. O. | 192/91 A |

Primary Examiner—Leslie A. Braun
Assistant Examiner—Andrea Pitts

[57] ABSTRACT

A multiple disk clutch has a clutch disk stack which is pressed together by a spring arrangement and released by a fluid pressure operated piston which is movable against the force of the spring arrangement. To provide a low cost clutch with fewer parts, the clutch disk stack is placed in an essentially sealed chamber which can be pressurized by a pressure source. One side of the chamber is closed by the piston. The chamber therefore serves both as the clutch disk stack chamber and the piston pressure chamber. If the pressure in the chamber increase, the piston moves against the spring and releases the plates. If the pressure in the chamber decreases, the clutch plates are pressed back together by the spring.

8 Claims, 2 Drawing Sheets

MULTI-DISK CLUTCH

BACKGROUND OF THE INVENTION

1. Field of the Invention

The invention concerns a multi-disk clutch of the type having layered clutch disks that can be pressed together by a spring arrangement to engage the clutch and a piston that can be actuated by a pressurized medium to move against the spring force to separate the clutch disks from each other.

2. Description of the Related Art

Multi-disk clutches are typically biased either into or out of engagement by a spring arrangement, then moved out or into engagement by using pressurized oil or air in a piston chamber to press a piston against the force of the spring. Such clutches often are used in agricultural and industrial vehicles, such as agricultural tractors and the like, to control the front wheel drive. For safety reasons in this situation, the stack of clutch disks is loaded by a spring arrangement so that the clutch is engaged when the clutch piston chamber is de-pressurized and disengaged when the piston chamber is pressurized.

In addition to the clutch disks, clutches of this type contain pressure plates that cover the stack of clutch disks on either side, some mechanism for transmitting the force of the piston to the spring arrangement and other auxiliary devices. Typically, a pressure plate supports the clutch drum side of the stack of clutch disks, while the spring engages the other side of the stack. Of course, all of these various components increase the cost of producing the clutch.

SUMMARY OF THE INVENTION

It is the object of the present to provide a low cost multi-disk clutch, and in particular, one in which the number of components is to be reduced, with the remaining components performing added functions.

This object is achieved according to the present invention by locating the clutch disks in a generally sealed chamber, which is enclosed on at least one side by a piston, and in which the chamber can be connected to a source of pressure medium. The disk chamber thereby simultaneously serves as the piston chamber, and the pressure medium for the piston simultaneously can be used as the cooling medium for the clutch disks.

This structure eliminates pressure plates and auxiliary devices to transmit the force of the piston to the spring arrangement, since the mechanism for disengaging the clutch has been integrated into the space for the clutch disks. The number of parts therefore is reduced, resulting in a cost effective design that is compact and nevertheless allows cooling oil to flow through the stack of clutch disks.

The pressure medium is preferably an incompressible fluid such as pressurized oil, although in principle such a clutch can also be designed for compressed air.

Preferably, the clutch disks are a stack of disks arranged between a radial surface of the housing enclosing the chamber and a radial surface of the piston. Thus the piston itself serves as the clutch pressure plate, and separate clutch pressure plates are not required.

A simple embodiment for the spring arrangement is to have the side of the piston external to the chamber engage a compression spring, which may be a Belleville spring whose inner or outer edge is supported against the housing or clutch drum.

To avoid axial forces between the clutch components and the clutch shaft due to the pressure load in the chamber, the surfaces of the piston and the clutch drum affected by the pressure medium should preferably be designed to have the same surface areas.

It is advantageous to supply the pressure medium through an axial bore in the clutch shaft, with at least one supply bore connecting the chamber with the axial bore, where the pressure can be controlled by a control valve. Most appropriately, several supply bores can be distributed over the axial extent of the stack of clutch disks. This allows the pressure medium to spread rapidly through the entire chamber and penetrate between the clutch disks, so that the disks can more easily separate from each other. Axial bores may also be provided in the clutch disks to further aid this process. Such bores preferably are provided in the inner disks which are connected with the shaft, in particular in the area that lies radially outward of the set of gear teeth between the clutch hub and the shaft.

To improve the penetration of the pressure medium between the clutch disks, there is a further advantage in providing grooves generally radial in the surface of the clutch disks. The grooves also should be relatively narrow to avoid an excessive reduction in the disk lining. The pressure medium then can spread across the friction surfaces and contact surfaces of the clutch disks, helping the clutch disks separate from each other whenever a certain pressure in the clutch disk chamber is reached and the piston is moved against the spring load to disengage the clutch.

High loads on the clutch can result in the clutch disks slipping with respect to each other, even when the clutch is engaged. This carries with it the danger that the temperature of the clutch disks rise due to friction after only a short time, and that the disks might be damaged.

Accordingly, a further embodiment of the invention provides for cooling of the clutch disks when the clutch is engaged by providing a valve through which a radially outward region of the chamber can be connected to a reservoir for the pressure medium when the clutch is engaged. This valve allows flow of the pressure medium (simultaneously used as a cooling medium) through the stack of clutch disks even when the disks are engaged. However, the valve preferably closes the outlet to the reservoir when the chamber is pressurized.

A convenient design for the valve is to have it controlled by the pressure of the medium in the chamber, so that it closes the connection to the reservoir at a pressure that is below that necessary to separate the disks from each other. The closing pressure should be low, if possible, for example, one tenth of the system pressure, so that not too much pressure medium flows through the connection into the reservoir when the clutch is disengaged. A high closing pressure would also require a high spring force for the spring arrangement. At the same time, the cross sectional area of the connection between the chamber and the reservoir should be designed so that adequate cooling flow is assured despite the relatively low pressure difference.

Alternatively, or in addition to this valve, outlet openings for the pressure medium can be provided in the outer surface of the clutch drum surrounding the clutch disks, dimensioned in such a way that they throttle flow and permit a pressure buildup in the chamber during clutch disengagement, yet permit adequate cooling flow when the clutch is engaged. To cool the clutch when it is engaged, the cooling flow is maintained by the centrifugal forces existing in the chamber and/or by a relatively small excess pressure in the chamber which is retained when the clutch is engaged.

The multi-disk clutch according to the invention can also be designed to great advantage as safety clutch in which the clutch disks separate from each other upon excessive heating and thereby are protected against damage. The chamber in which the clutch disks are located remains largely sealed even when the clutch is engaged, so that the pressure medium cannot escape from the chamber quickly. If heating in the stack of clutch disks occurs due to a process of slipping when the clutch is engaged, then the pressure in the chamber will increase according to the vapor pressure characteristic of the pressure medium. If the pressure in the chamber exceeds the opposing pressure generated by the spring arrangement, then the piston will move, the clutch disks will separate and torque transmission will be interrupted. Any further heating of the clutch disks will be avoided. The release point of the clutch can be controlled by appropriate design of the clutch and selection of the pressure medium.

Due to the extensive sealing of the chamber required for it to function as a pressure chamber, coolant flow generally is limited. Hence the multi-disks clutch according to the invention is preferably applied in situations in which relatively low friction power must be transmitted or where low relative rotational speeds occur between the shafts to be connected when the clutch is disengaged. This is the case, for example, between differential gear boxes of passenger vehicles as well as in front axle clutches and differential locking clutches.

BRIEF DESCRIPTION OF THE DRAWINGS

The present invention will be described in greater detail with reference to the drawings, in which.

DETAILED DESCRIPTION OF THE PREFERRED EMBODIMENTS

Figure 1:
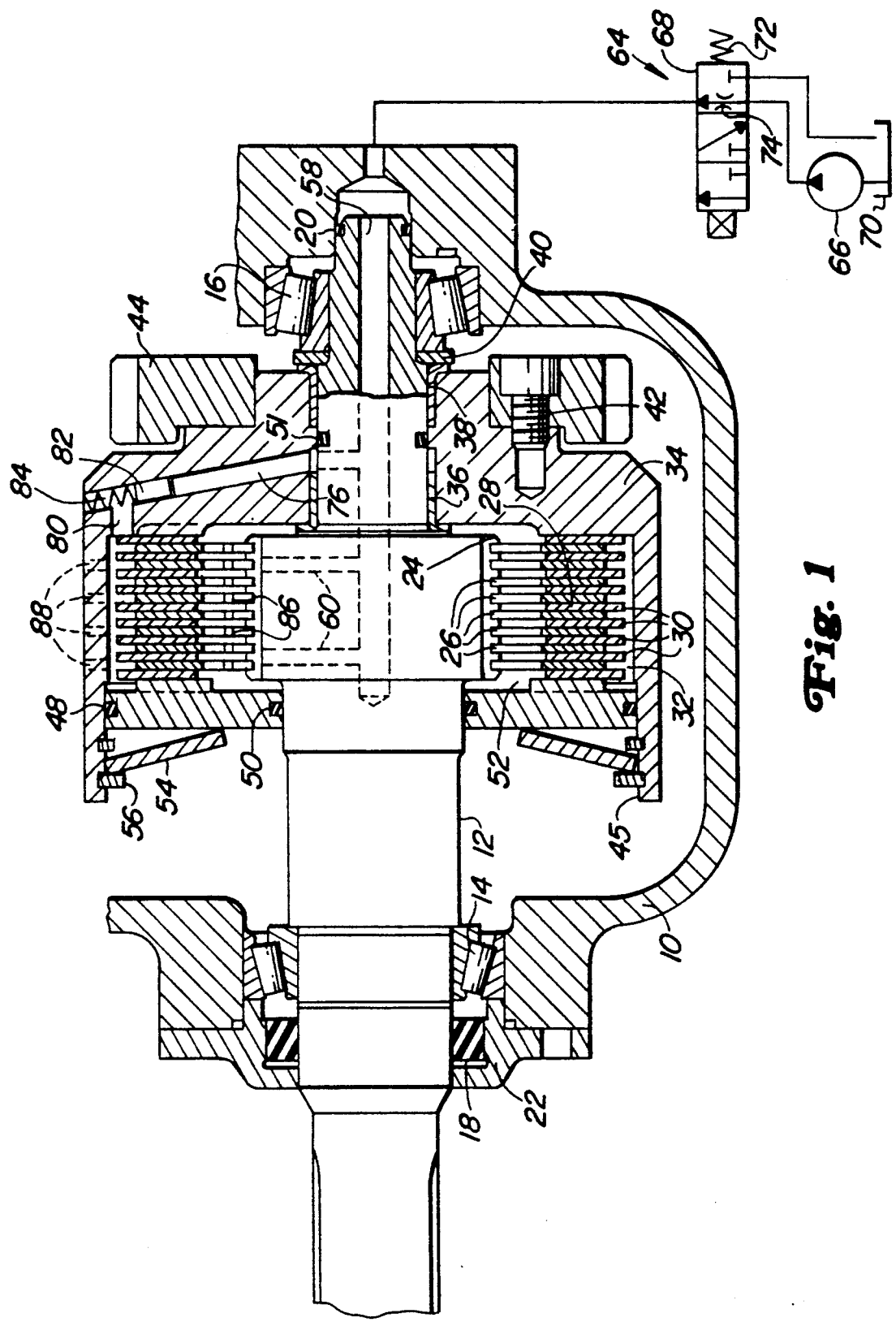
FIG. 1 shows a cross section of a first embodiment of a multi-disk clutch according to the invention.

Referring to FIG. 1, a shaft 12 is supported in tapered roller bearings 14, 16 in the clutch housing 10. The pressure/cooling oil collects in the clutch housing 10, which acts as a reservoir. The shaft ends are sealed by seals 18, 20 against the clutch housing 10 or a bearing cover 22.

In its central region, the shaft 12 carries a set of gear teeth 24 that mesh with the inner disks 26 of a stack of disks 28. The outer disks 30 of the stack of disks 28 mesh with a set of gear teeth 32 of a clutch drum 34.

The clutch drum 34 acts as a housing for the stack of disks 28 and is supported by journal bushings 36, 38 on the shaft 12, free to rotate, and is secured against axial movement by a contact washer 40. A drive gear 44 is attached to the clutch drum 34 by screws 42 and meshes with an output gear of a vehicle gearbox, not shown.

A piston 46 is arranged in a cylindrical recess 45 of the clutch drum 34 so as to be axially movable but fixed against rotation. The piston 46 is sealed by an O-ring 48 against the clutch drum 34 and by a seal 50 against the shaft 12. The seal 50 is designed to accommodate rotational as well as axial movements. A further seal 51 seals the shaft 12 with respect to the clutch drum 34.

The clutch drum 34, the shaft 12 and the piston 46 enclose a generally sealed chamber 52 that contains the stack of clutch disks 28. The stack of disks 28 is in contact on one side with a ring-shaped projection of the clutch drum 34 and on its other side with a ring-shaped projection of the piston 46. Separate pressure plates need not be provided.

A Belleville spring 54 lying outside the piston 46 but inside the recess 45 of the clutch drum 34 has an outer edge supported by a retaining ring 56 that engages the clutch drum 34 and an inner edge preloaded against the exterior surface of the piston 46, so that the piston 46 is pressed against the stack of disks 28 to compress it. When the stack of disks 28 is compressed, the clutch is engaged and transmits torque from the input gear 44 through the clutch drum 34 to the shaft 12. The preload of the Belleville spring 54 is selected so that a predetermined torque is transmitted without the disks 26, 30 slipping with respect to each other.

The shaft 12 is provided with an axial bore 58 as well as radial supply bores 60, only two of which are shown. The supply bores 60 connect the axial bore 58 with the chamber 52. The axial bore 58 is connected through a housing bore 62 with a hydraulic supply system 64. The latter is formed generally by a hydraulic pump 66, a valve 68 and a reservoir 70. The pump 66 delivers the system pressure, for example, 12 Bar. The valve 68 shown is an electromagnetic three-way control valve with three positions, which can be moved from its first position as shown by an electric control signal against the force of a spring 72. The degree of movement depends upon the magnitude of the electric control signal.

In the first position (illustrated), the valve 68 connects the outlet of the hydraulic pump 66 with the chamber 52. In this position the valve 68 contains a throttling restriction 74 so that the system pressure of the pump 66 is reduced, for example to approximately 1 or 2 Bar. This pressure is not sufficient to move the piston 46 against the force of the Belleville spring 54 towards the outside (which would release the disks 26, 30 from one another to disengage the clutch). However, it is sufficient to cool the stack of disks 28, as will be described below.

In a second, central position of the valve 68, the chamber 52 is connected with the reservoir 70, so that the pressure in the chamber 52 is released and the clutch is engaged.

In a third position, the valve 68 connects the outlet of the hydraulic pump 66 with the chamber 52 without interposing any significant throttling. This increases the pressure in the chamber 52 to the system pressure and results in the piston 46 moving outward against the force of the Belleville spring 54. The disks 26, 30 then can rotate with respect to each other, disengaging the clutch and halting transmission of any torque.

A generally radial channel 76 is located in the clutch drum 34 to connect a corresponding channel 78 and the axial bore 58 in the shaft 12 with the outer contour of the clutch drum 34. The outer region of the channel 76 also is connected by a cross channel 80 with the radially outward region of the chamber 52. A movable valve 82 is arranged in the channel 76 which can close the opening between the cross channel 80 and the channel 76. The valve 82 is loaded by a spring 84 to bias the valve 82 radially inward to its open position.

With the valve 82 in its open position, coolant flow is possible from the pump 66 through the valve 68, the bore 58, the supply bores 60, the chamber 52, the cross channel 80 and the radial channel 76 to the reservoir in the clutch housing 10. As a result, coolant flow is maintained when the clutch is engaged, which protects the clutch disks 26, 30 from overheating if the clutch disks 26, 30 slip with respect to one another due to an overload.

To disengage the clutch, the electromagnetic coil of the valve 68 is energized to move the valve to its third position. This supplies the full system pressure of the hydraulic pump 66 to the chamber 52 without any throttling. This also simultaneously moves the valve 82 radially outward against the force of the spring 84 due to the pressure in channel 76 and closes the cross channel 80, thereby avoiding a pressure drop in the chamber 52. Hence no cooling is performed on the stack of clutch disks 28 when the clutch is disengaged, when cooling would be superfluous.

If the clutch is again to be engaged, the electromagnetic coil of the valve 68 is de-energized so that the valve 68 returns to its first position. In doing so, it passes through its center position, in which the chamber 52 is connected with the reservoir 70 and its pressure quickly released. The valve 68 is so designed that it remains in this center position for a period of time that is adequate to reduce the pressure in the chamber 52 and the bore 58 completely. This pressure reduction also allows reopening of the valve 82 due to the influence of the spring 84, opening the cross channel 80.

Instead of or in addition to using the valve 82 to maintain coolant as shown in FIG. 1, flow can be maintained by providing relatively narrow bores 88 in the circumference of the outer cylinder surface of the clutch drum 34. Fluid then can be continually ejected from the chamber 52 through these bores 88 due to centrifugal force or the pressure supplied by the hydraulic system 64. The bores 88 must be sufficiently large to assure an adequate flow of coolant, yet not large enough to lead to an unacceptably high pressure drop in the chamber 52 when the clutch is disengaged.

Figure 2:
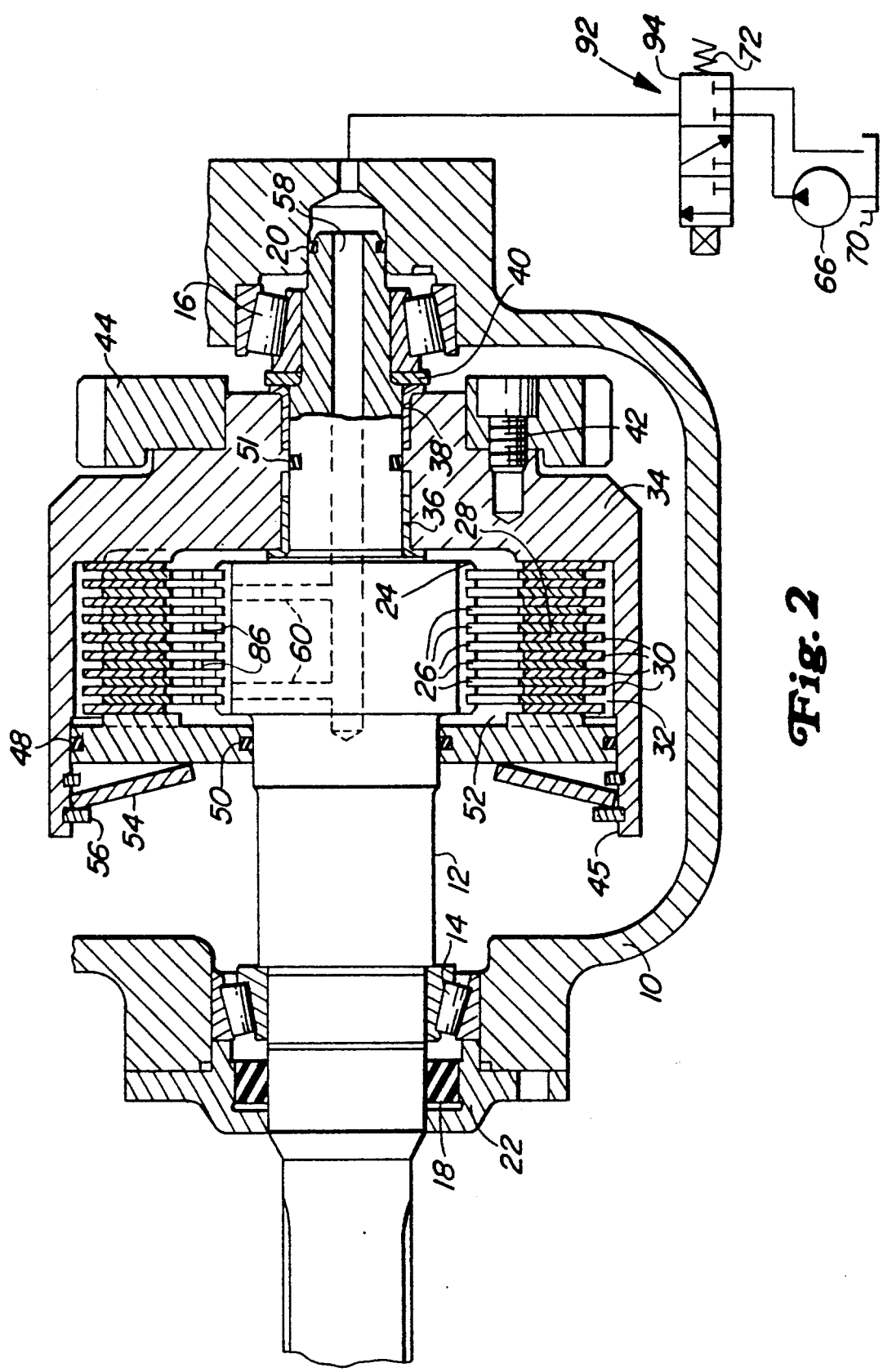
FIG. 2 shows a cross section of a second embodiment of a multi-disk clutch according to the invention.

FIG. 2 illustrates an alternative embodiment of the present invention. Most of the elements in FIG. 2 are identical to those in FIG. 11, have been identified with the same reference numerals, and will not be further described herein.

In the multi-disk clutch of FIG. 2, the chamber 52 is hermetically sealed from the outside and is connected to a hydraulic system 92 only by the radial supply bores 60, the axial bore 58 and the housing bore 62. Channels 76, 78, 80 and 88 have been omitted. The hydraulic system 92 differs from the hydraulic system 64 shown in FIG. 1 in that the valve 94 completely interrupts fluid flow from the hydraulic pump 66 to the chamber 52 when it is in its first position. In this valve position, fluid can neither be supplied to the chamber 52 nor drained from the chamber 52. If the clutch is overloaded, the disks 26, 30 will overheat, in turn heating the pressure medium in the chamber 52. As the temperature of the pressure medium rises, the pressure in the chamber 52 will increase in accordance with the vapor pressure characteristic of the pressure medium. If the pressure rises above the opposing pressure generated by the Belleville spring 54, the piston 46 will move to the left and the clutch disks 26, 30 will separate. This protects the clutch from damage due to overheating.

In either of the above embodiments, the inner disks 26 may be provided with cross bores 86 in their radially inward region to assure good pressure equalization in the chamber 52. In addition the surfaces of the disks 26, 30 that carry the clutch lining may be provided with generally radial grooves through which fluid can penetrate between the disks 26, 30, so that pressure equalization occurs between the disks 26, 30. Furthermore the grooves allow fluid to flow from their radially inward to radially outward sides, helping maintain a flow of coolant, even when the clutch is engaged.

While the invention has been described in conjunction with a specific embodiment, it is to be understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:
1. A multi-disk clutch comprising:
 a. a clutch drum having a recess formed therein;
 b. a clutch hub substantially within said clutch drum recess;
 c. a shaft to which said clutch hub is fixed for rotation and about which said clutch drum is rotatably mounted;
 d. a piston substantially within said clutch drum recess, said piston and said clutch drum recess substantially defining a chamber therebetween;
 e. a first plurality of disks within said chamber and fixed for rotation with said clutch drum;
 f. a second plurality of disks within said chamber, fixed for rotation with said clutch hub, and interleaved between and selectively engageable with said first plurality of disks;
 g. spring means biasing said piston to move said first and second plurality of disks into engagement with each other;
 h. control means for selectively providing a pressurized medium to said chamber to press said piston away from said first and second pluralities of disks to allow said disks to disengage, said control means comprising:
  1) at least one axial bore and at least one generally radial supply bore formed in said shaft connecting said chamber with said axial bore to provide a passage to supply said pressure medium to said chamber;
  2) a reservoir for said pressure medium; and
  3) valve means for connecting a radially outward region of said chamber to said reservoir when said clutch is engaged.

2. The multi-disk clutch of claim 1, wherein said clutch drum and said piston each have radial surfaces between which said disks are compressed when said piston presses said disks together.

3. The multi-disk clutch of claim 1, wherein said spring means comprises a compression spring located in said clutch drum recess on a side of said piston outside of said chamber, and means for holding one side of said compression spring axially fixed relative to said clutch drum with the other side of said compression spring pressed against said piston.

4. The multi-disk clutch of claim 1, wherein surfaces of said clutch drum and said piston acted upon by said pressure medium have substantially the same surface in area.

5. The multi-disk clutch of claim 1, wherein said valve opens and closes based upon the pressure of said pressure medium, and wherein said valve closes at a pressure lower than the pressure necessary to move said piston away from said disks sufficiently to allow said disks to disengage.

6. The multi-disk clutch of claim 1, wherein said disks have axial penetrations and grooves formed therein to enhance flow of said pressure medium.

7. The multi-disk clutch of claim 1, further comprising sealing means for hermetically sealing said chamber when said clutch is engaged, and wherein said pressure medium has a vapor pressure such that it will build sufficient pressure in said chamber when a predetermined temperature is exceeded to move said piston away from said disks sufficiently to allow said disks to disengage.

8. The multi-disk clutch of claim 1, wherein a portion of said clutch drum generally surrounding said disks has penetration openings formed therein, said penetrations being of a size that they act as throttling restrictions that permit a pressure build-up in the chamber when said clutch is disengaged, yet permit passage of a flow of coolant adequate to cool said clutch when said clutch is engaged.

* * * * *